United States Patent [19]

Pyzik et al.

[11] Patent Number: 4,883,776
[45] Date of Patent: Nov. 28, 1989

[54] SELF-REINFORCED SILICON NITRIDE CERAMIC OF HIGH FRACTURE TOUGHNESS AND A METHOD OF PREPARING THE SAME

[75] Inventors: Aleksander J. Pyzik, Midland; William J. Dubensky, Traverse City; Douglas B. Schwarz, Midland; Donald R. Beaman, Midland, all of Mich.

[73] Assignee: The Dow Chemical Company, Midland, Mich.

[21] Appl. No.: 148,748

[22] Filed: Jan. 27, 1988

[51] Int. Cl.$^4$ ............................................. C04B 35/58
[52] U.S. Cl. ...................................... 501/10; 501/95; 501/97; 501/98; 264/66
[58] Field of Search ...................... 501/10, 95, 97, 98; 264/66

[56] References Cited

U.S. PATENT DOCUMENTS

| | | | |
|---|---|---|---|
| 3,950,464 | 4/1976 | Masaki | 264/65 |
| 4,004,937 | 1/1977 | Masaki | 106/59 |
| 4,025,351 | 5/1977 | Masaki | 106/59 |
| 4,046,580 | 9/1977 | Ishii et al. | 106/55 |
| 4,097,293 | 6/1978 | Komeya et al. | 106/43 |
| 4,119,689 | 10/1978 | Prochazka et al. | 264/65 |
| 4,179,301 | 12/1979 | Buljan | 106/73.5 |
| 4,218,257 | 8/1980 | Oda | 106/73.5 |
| 4,227,842 | 10/1980 | Samanta et al. | 409/131 |
| 4,279,657 | 7/1981 | Greskovich | 106/73.5 |
| 4,296,065 | 10/1981 | Ishii et al. | 264/325 |
| 4,323,325 | 4/1982 | Samanta et al. | 409/131 |
| 4,406,668 | 9/1983 | Sarin et al. | 51/295 |
| 4,407,970 | 10/1983 | Komatsu et al. | 501/97 |
| 4,511,525 | 4/1985 | Tsuge et al. | 264/65 |
| 4,543,345 | 9/1985 | Wei | 501/95 |
| 4,603,116 | 7/1986 | Smith et al. | 501/97 |
| 4,609,633 | 9/1986 | Fukuhara | 501/97 |
| 4,652,276 | 3/1987 | Burden | 501/98 X |
| 4,699,890 | 10/1987 | Matsui | 501/98 |
| 4,717,693 | 1/1988 | Wittmer | 501/95 X |
| 4,734,234 | 3/1988 | Sterzel | 501/97 X |
| 4,753,764 | 6/1988 | Kamijo et al. | 501/90 X |

FOREIGN PATENT DOCUMENTS

| | | |
|---|---|---|
| 079678 | 5/1983 | European Pat. Off. . |
| 100380 | 7/1984 | European Pat. Off. . |
| 228022 | 7/1987 | European Pat. Off. . |
| 58-064274 | 4/1983 | Japan . |
| 59-021413 | 2/1984 | Japan . |
| 61-78657 | 4/1986 | Japan . |
| 61-106430 | 5/1986 | Japan . |

OTHER PUBLICATIONS

Derwent 87:098199/14.
Akihiko Tsuge et al., Journal of The American Ceramics Society, 58, 323–326 (1975).
F. F. Lange, Journal of The American Ceramics Society, 62, 1369–1374 (1983).
Chemical Abstracts 105:157787W (1986).
Derwent 82:51169E.

Primary Examiner—William R. Dixon, Jr.
Assistant Examiner—Karl Group
Attorney, Agent, or Firm—Marie G. Zuckerman; Dan R. Howard

[57] ABSTRACT

A process for preparing a self-reinforced silicon nitride ceramic body of high fracture toughness comprising hot-pressing a powder mixture containing silicon nitride, magnesium oxide, yttrium oxide and calcium oxide under conditions such that densification and the in situ formation of β-silicon nitride whiskers having a high aspect ratio occur. A novel silicon nitride ceramic of high fracture toughness is disclosed comprising a β-silicon nitride crystalline phase wherein at least about 20 volume percent of the phase is in the form of whiskers having an average aspect ratio of at least about 2.5; a glassy second phase containing magnesium oxide, yttrium oxide, calcium oxide, and silica in a total amount not greater than about 35 weight percent; and not greater than about 10 weight percent of the total weight as other phases.

15 Claims, 1 Drawing Sheet

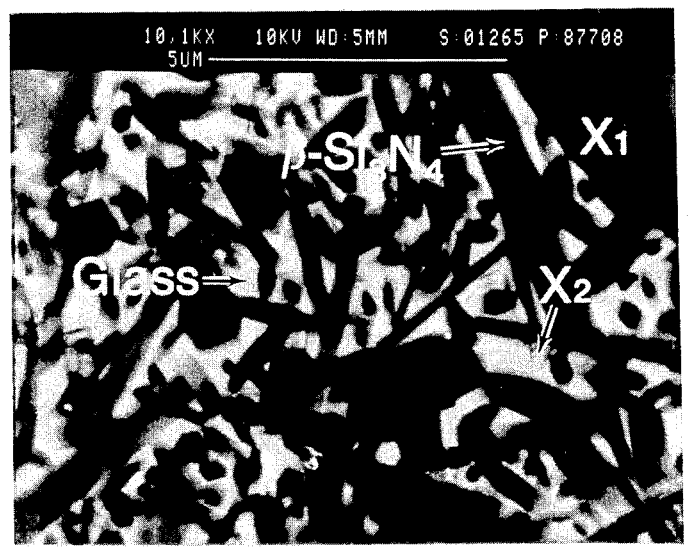

SELF-REINFORCED SILICON NITRIDE CERAMIC OF HIGH FRACTURE TOUGHNESS AND A METHOD OF PREPARING THE SAME

BACKGROUND OF THE INVENTION

This invention pertains to a silicon nitride ($Si_3N_4$) ceramic body and a process for preparing the ceramic body.

Silicon nitride ceramics are recognized for their excellent mechanical and physical properties, including good wear resistance, low coefficient of thermal expansion, good thermal shock resistance, high creep resistance and high electrical resistivity. In addition, silicon nitride ceramics are resistant to chemical attack, particularly to oxidation. For these attributes silicon nitride is useful in a variety of wear and high temperature applications, such as cutting tools and parts in pumps and engines.

Failure of silicon nitride ceramics is generally associated with brittleness and flaws. The object therefore is to prepare a silicon nitride ceramic with high fracture toughness ($K_{IC}$) and strength. Fracture strength is directly proportional to the fracture toughness and inversely proportional to the square root of the flaw size. High fracture toughness combined with small flaw size is therefore highly desirable. Monolithic silicon nitride, however, has a relatively low fracture toughness of about 5 MPa $(m)^{\frac{1}{2}}$.

U.S. Pat. No. 4,543,345 teaches that the addition of silicon carbide whiskers to ceramic materials can result in an increase in the fracture toughness. Silicon carbide whiskers have a single crystal structure and are in a size range of about 0.6 $\mu$m in diameter and about 10 $\mu$m to about 80 $\mu$m in length. This technique, however, does not provide significant toughening in the case of silicon nitride ceramics. Moreover, the use of silicon carbide whiskers is associated with serious processing problems. The whiskers have a tendency to agglomerate and settle. It is difficult to deagglomerate the whiskers without significantly destroying the whiskers' length. In addition, the whiskers are difficult to manufacture; thus, they display inconsistent properties and are costly. It would be highly desirable to have a silicon nitride ceramic of high fracture toughness which does not require the presence of silicon carbide whiskers.

It is known that the high temperature strength of hot-pressed silicon nitride ceramics can be increased by crystallization of the grain-boundary glass phase (second phase). This has been demonstrated in a hot-pressed composite containing beta($\beta$)-silicon nitride and a crystalline second phase of $Si_3N_4 \cdot Y_2O_3$, as reported by Akihiko Tsuge et al. in the *Journal of the American Ceramics Society*, 58, 323-326 (1975). However, the fracture toughness of this silicon nitride is only 5-6 MPa $(m)^{\frac{1}{2}}$.

It is also known that the presence of $\beta$-silicon nitride with a high aspect ratio can increase the fracture toughness of silicon nitride ceramics, as reported by F. F. Lange, in the *Journal of the American Society*, 62 (12), 1369-1374, (1983). "Aspect ratio" is defined as the ratio of the length of the whisker to the diameter or width of the whisker. Thus, whiskers with a high aspect ratio are fibrous in nature. If such whiskers are also strong, crack propagation must take a tortuous path around the whiskers, thereby leading to high fracture toughness. The transformation of alpha($\alpha$)-silicon nitride to $\beta$-silicon nitride takes place above 1600° C.; however, crystals of the beta phase precipitate usually as a mixture of equiaxed grains and elongated grains with a low aspect ratio. Reproducible control of the aspect ratio is a difficult problem.

Typically, the prior art is silent with regard to aspect ratio and fracture toughness of silicon nitride ceramics. U.S. Pat. No. 4,279,657, for example, discloses a powder dispersion containing silicon nitride and magnesium oxide which is hot-pressed to form a light-transmitting silicon nitride ceramic. The ceramic is disclosed to comprise more than 50 weight percent $\beta$-silicon nitride ranging in grain size from 1 $\mu$m to about 10 $\mu$m, but typically less than 5 $\mu$m. This patent teaches that impurities, such as calcium, in a total amount greater than about 0.1 weight percent are undesirable. U.S. Pat. No. 4,227,842 discloses a cutting tool consisting essentially of beta phase silicon nitride and yttrium oxide. The tool is prepared by hot-pressing a powder mixture of $\alpha$-silicon nitride and yttrium oxide to obtain a ceramic of 100 percent theoretical density. U.S. Pat. No. 4,652,276 teaches a cutting tool comprising a granular phase consisting essentially of $\beta$-silicon nitride and an intergranular amorphous phase consisting essentially of magnesium oxide from about 0.5 to about 10 weight percent, yttrium oxide from about 2.5 to about 10 weight percent, silicon oxide in an amount less than about 2.5 weight percent, and the balance less than 5 weight percent impurities such as aluminum. The tool is prepared by hot-pressing.

It would be very desirable to have a silicon nitride ceramic of high fracture toughness and high fracture strength. It would be advantageous if such a strong silicon nitride ceramic could be prepared without silicon carbide reinforcing whiskers. Moreover, it would be highly desirable to have a process which would be reproducible, inexpensive, and amenable to industrial scale-up for preparing such a tough and strong silicon nitride ceramic.

SUMMARY OF THE INVENTION

In one aspect this invention is a process for preparing a self-reinforced silicon nitride ceramic body containing predominately $\beta$-silicon nitride whiskers having a high average aspect ratio. The process comprises preparing a powder mixture comprising:
(a) silicon nitride in an amount sufficient to provide a ceramic body;
(b) magnesium oxide in an amount sufficient to promote densification of the powder;
(c) yttrium oxide in an amount sufficient to promote the essentially complete conversion of the starting silicon nitride to $\beta$-silicon nitride; and
(d) calcium oxide in an amount sufficient to promote the formation of $\beta$-silicon nitride whiskers, and hot-pressing the powder under conditions such that densification and in situ formation of $\beta$-silicon nitride whiskers having a high average aspect ratio occur. In this manner a self-reinforced silicon nitride ceramic body having a fracture toughness greater than about 6 MPa $(m)^{\frac{1}{2}}$, as measured by the Chevron notch technique described hereinbelow, is formed. For the purposes of the present invention a "high" average aspect ratio means an average aspect ratio of at least about 2.5.

In another aspect this invention is a silicon nitride ceramic body having a fracture toughness greater than about 6 MPa $(m)^{\frac{1}{2}}$, as measured by the Chevron notch technique described hereinbelow, comprising:

(a) a crystalline phase of β-silicon nitride of which at least about 20 volume percent, as measured in a plane by scanning electron microscopy, is in the form of whiskers having an average aspect ratio of at least about 2.5; and (b) a glassy phase in an amount not greater than about 35 weight percent of the total weight and comprising magnesium oxide, yttrium oxide, calcium oxide, and silica.

In a third aspect this invention is a cutting tool comprising the above-identified silicon nitride ceramic body.

Unexpectedly, the silicon nitride ceramic body of this invention exhibits a significantly higher fracture toughness than the monolithic or whisker-reinforced silicon nitride ceramics of the prior art. Moreover, if the fracture toughness of the silicon nitride ceramic of this invention is normalized with respect to density, the normalized toughness is among the highest known for any ceramic material. Advantageously, the silicon nitride ceramic of this invention is self-reinforced and does not require the presence of expensive silicon carbide whiskers. More advantageously, the process for preparing the novel, self-reinforced silicon nitride ceramic body of this invention is reproducible, amenable to industrial scale-up, and less expensive than processes using silicon carbide whisker reinforcement.

BRIEF DESCRIPTION OF THE FIGURE

FIG. 1 is a photomicrograph of the silicon nitride ceramic composition of this invention. This photomicrograph is representative of the preferred embodiments of this invention. Elongated whiskers of β-silicon nitride are readily observed.

DETAILED DESCRIPTION OF THE INVENTION

The silicon nitride starting material which is used in the preparation of the ceramic body of this invention can be any silicon nitride powder, including the crystalline forms of α-silicon nitride and β-silicon nitride, or noncrystalline amorphous silicon nitride, or mixtures thereof. Preferably, the silicon nitride powder is predominately in the alpha crystalline form or the amorphous form, or mixtures thereof. More preferably, the starting silicon nitride is predominately in the alpha crystalline form. It is also advantageous if the preferred starting powder possesses a high α/β weight ratio. Preferably, the starting powder contains no greater than about 20 weight percent β-silicon nitride; more preferably, no greater than about 10 weight percent β-silicon nitride; most preferably, no greater than about 6 weight percent β-silicon nitride.

Generally, the higher the purity of the starting silicon nitride powder, the better will be the properties of the finished ceramic body. Depending on the source, however, the silicon nitride powder may contain metallic and nonmetallic impurities. Some impurities may be tolerated in the powder, although it is preferred to minimize these as much as possible. Oxygen, for example, is present to some extent in the form of silica, $SiO_2$, which usually is found as a coating on the surface of the silicon nitride particles. Preferably, the oxygen content is no greater than about 5 weight percent. Above this preferred upper limit, the silica may create a large glassy phase which may lower the high temperature properties of the finished ceramic. More preferably, the oxygen content is no greater than about 2.5 weight percent; most preferably, no greater than about 2.0 weight percent. In addition to oxygen, elemental silicon is usually present in amounts ranging up to about 0.5 weight percent. These amounts of elemental silicon are not deleterious and can be tolerated. Other nonmetals, such as carbon which is likely to form silicon carbide during hot-pressing or sintering, are tolerable in small amounts. In addition to nonmetallic contaminants, the silicon nitride powder can be contaminated with metals, such as iron, aluminum, and lead. These may create low-melting intergranular phases which lower high temperature properties in the finished ceramic. In general, the total percentage of metallic contaminants preferably should not exceed about 0.5 weight percent; and more preferably should not exceed about 0.1 weight percent. Iron is particularly deleterious because it forms a brittle iron silicide, which can reduce the strength of the $Si_3N_4$ ceramic. It is preferred, therefore, that the silicon nitride starting powder contains less than about 1000 ppm iron. More preferably, the silicon nitride powder contains less than about 700 ppm iron; even more preferably, less than about 500 ppm iron; most preferably, less than about 250 ppm iron. Unexpectedly, as described hereinbelow, calcium has been found to be advantageous; therefore, silicon nitride powders doped with up to about 5.3 weight percent calcium oxide are desirable. Such high levels of calcium oxide are not typically available in commercial silicon nitride powders, and it is more common to find powders containing only 100 ppm or less of calcium oxide.

The silicon nitride starting powder can be of any size or surface area provided that the ceramic body of this invention is obtained by hot-pressing. Large particles having an average diameter in the range from about 15 μm to about 50 μm, for example, may be in the form of hard agglomerates which cannot be easily broken. Powders containing such agglomerates make poor ceramics. On the other hand, very fine powders having an average diameter less than about 0.2 μm are difficult to obtain uniformly and to process. Preferably, the particles have an average diameter in the range from about 0.2 μm to about 10.0 μm; more preferably, from about 0.5 μm to about 3.0 μm. Preferably, the surface area of the silicon nitride particles is in the range from about 5 $m^2/g$ to about 15 $m^2/g$, as determined by the Brunauer-Emmett-Teller (BET) method of measuring surface area, which is described by C. N. Satterfield in *Heterogeneous Catalysis in Practice*, McGraw-Hill Book Company, 1980, pp. 102-105. More preferably, the surface area is in the range from about 8 $m^2/g$ to about 15 $m^2/g$.

In the process of this invention it is required to mix the starting silicon nitride powder, described hereinabove, with a combination of metal oxides to obtain a powder mixture, which is used in preparing the tough silicon nitride ceramic body of this invention. These metal oxides are magnesium oxide (MgO), yttrium oxide ($Y_2O_3$), and calcium oxide (CaO). Ordinarily, the total quantity of metal oxides is no greater than about 35 weight percent of the total weight. The total quantity of metal oxides will depend, however, on the end use application of the fired ceramic. Preferably, the total quantity of metal oxides is in the range from about 15 weight percent to about 35 wight percent for medium temperature and/or the highest fracture toughness applications. By "medium temperature" it is meant temperatures in the range from about 900° C. to about 1200° C. Ceramic cutting tools are an example of a medium temperature and very high fracture toughness application. Preferably, the total quantity of metal oxides is in the range from about 3 weight percent to about 15 weight percent for high temperature and/or moderately high fracture toughness applications. By "high temperature" it is meant temperatures from about 200° C. to about 1400° C. Parts for ceramic engines are an example of a high temperature and moderately high fracture toughness application.

Raw silicon nitride powders cannot be densified to high densities in the absence of densification aids, such as refractory oxides, or nitrides, or a combination of these. Thus, magnesium oxide is admixed with the silicon nitride starting powder in a manner described hereinbelow for the purpose of promoting densification of the silicon nitride during processing. Ordinarily, the magnesium oxide forms a liquid phase at between about 1300° C. and 1500° C. into which the α-silicon nitride dissolves. The rate of mass transport of the α-silicon nitride is fast in magnesium oxide; thus, the silicon nitride density increases until a critical mass is reached and precipitation occurs. Any amount of magnesium oxide which promotes this densification and produces the tough silicon nitride ceramic body of the invention is acceptable. Preferably, the quantity of magnesium oxide is in the range from about 1.0 weight percent to about 20.6 weight percent based on the total weight of the powder mixture. More preferably, the quantity of magnesium oxide is in the range from about 2.4 weight percent to about 9.8 weight percent; most preferably, from about 4.2 weight percent to about 6.1 weight percent.

In addition to magnesium oxide, the powder mixture is required to contain yttrium oxide. Yttrium oxide forms a glassy phase through which mass transport is considerably slower than in magnesium oxide. Thus, α-silicon nitride dissolves in yttrium oxide on heating, but is not readily densified. Advantageously, however, yttrium oxide promotes the rapid, essentially complete conversion of α-silicon nitride to β-silicon nitride. This conversion is most desirable because the β-silicon nitride in the form of elongated whiskers is responsible for the high fracture toughness and high fracture strength of the silicon nitride ceramic body of this invention. Any amount of yttrium oxide can be employed in the starting powder providing the quantity is sufficient to cause the essentially complete conversion of the starting silicon nitride to β-silicon nitride, and is sufficient to produce the tough silicon nitride ceramic body of the invention. Preferably, the amount of yttrium oxide employed is in the range from about 0.7 weight percent to about 28.3 weight based on the total weight of the powder mixture. More preferably, the amount of yttrium oxide employed is in the range from about 2.6 weight percent to about 12.6 weight percent; most preferably, from about 4.3 weight percent to about 8.5 weight percent.

Surprisingly, the weight ratio of yttrium oxide to magnesium oxide has been found to affect the fracture toughness of the finished ceramic, providing calcium oxide is also present in the powder mixture. Any weight ratio of yttrium oxide to magnesium oxide is acceptable providing the fracture toughness shows an improvement over the prior art fracture toughness value of 5 MPa (m)$^{\frac{1}{2}}$ for nonreinforced, monolithic silicon nitride. Preferably, the Y$_2$O$_3$/MgO weight ratio is in the range from about 0.7 to about 4.2. More preferably, the Y$_2$O$_3$/MgO weight ratio is in the range from about 0.7 to about 2.8; most preferably, from about 1.0 to about 1.8. In the absence of calcium oxide the Y$_2$O$_3$/MgO weight ratio has no significant effect on the fracture toughness.

The third oxide required to be present in the powder mixture is calcium oxide. This oxide in particular helps to provide a ceramic body of superior fracture toughness and high strength. Just how the calcium oxide contributes to the excellent physical properties which are observed in the silicon nitride ceramic body of this invention is not completely understood. It is possible that the calcium oxide improves the viscosity of the glassy phase thereby facilitating the nucleation of elongated whiskers of β-silicon nitride; the latter being primarily responsible for the improved fracture toughness. The aforementioned theory is presented with the understanding that such a theory is not to be binding or limiting of the scope of the invention. Any amount of calcium oxide in the starting powder is acceptable providing the amount is sufficient to promote the formation of β-silicon nitride whiskers, described hereinbelow, and sufficient to produce the tough silicon nitride ceramic body of this invention. Preferably, the amount of calcium oxide employed is in the range from about 0.01 weight percent to about 5.3 weight percent based on the total weight of the powder mixture. More preferably, the amount of calcium oxide employed is in the range from about 0.1 weight percent to about 1.0 weight percent most preferably, from about 0.2 weight percent to about 0.5 weight percent.

It is desirable to use magnesium oxide, yttrium oxide, and calcium oxide powders which are pure and sufficiently small in size. Purity is not typically a problem, because commercially available oxide powders generally contain less than 20 ppm each of assorted impurities. These levels of impurities are tolerable. Larger amounts of impurities, as for example in the 0.5 weight percent range, are not recommended as they may cause a change in the final ceramic composition and properties. Iron, as noted hereinbefore, is particularly deleterious. A small powder particle size is favored, because dispersion is enhanced by smaller particles. Preferably, the oxide powders have an average particle size no greater than about 5 μm in diameter.

The preparation of the powder mixture containing silicon nitride, magnesium oxide, yttrium oxide, and calcium oxide is accomplished in any suitable manner. Ball-milling of the components in powder form is one acceptable manner of preparation. The preferred preparation, however, comprises preparing a finely-divided suspension of silicon nitride and the metal oxide powders in a carrier medium, and drying the suspension to obtain the powder mixture. The preparation of the finely-divided suspension of silicon nitride and metal oxide powders in a carrier medium requires no particular order of addition of the components. For example, it is possible to add the oxides to a colloidal suspension of silicon nitride in a carrier medium. Alternatively, silicon nitride can be added to a colloidal suspension of the metal oxide powders in a carrier medium. Preferably, the latter method is employed, as described hereinbelow.

The carrier medium may be any inorganic or organic compound which is a liquid at room temperature and atmospheric pressure. Examples of suitable carrier media include water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. Preferably, the carrier medium is water, an alcohol, or a ketone. More preferably, the carrier medium is water. The function of the carrier medium is to impart a viscosity suitable for mixing to the solid powders. Any quantity of carrier medium which achieves this purpose is sufficient and acceptable. Preferably, a quantity of carrier medium is employed such that the solids content is in the range from about 20 weight percent to about 50 weight percent. More preferably, a quantity of carrier medium is employed such that the solids content is in the range from about 35 weight percent to about 45 weight percent. Below the preferred lower limit the viscosity of the solid suspension may be too low and the deagglomeration mixing may be ineffective. Above the preferred upper limit the viscosity may be too high, and the deagglomeration mixing may be difficult.

The metal oxides are added to the carrier medium in any manner which gives rise to a finely dispersed suspension of metal oxides. Typically, the process is conducted in a large vessel at room temperature (taken as 23° C.) under air with vigorous stirring. Any common stirring means is suitable, such as a ball-milling device or an attrition mixer. An ultrasonic vibrator may be used in a supplementary manner to break down smaller agglomerates. The attrition mixer is preferred. Since yttrium oxide tends to flocculate with magnesium oxide and calcium oxide, preferably the latter two are added to the water, and afterwards the yttrium oxide is added. Lastly, the silicon nitride starting powder is added.

To aid in the dispersion of yttrium oxide and silicon nitride with magnesium oxide and calcium oxide, optionally one or more surfactants or dispersants can be added to the suspension. The choice of surfactant(s) or dispersant(s) can vary widely as is well-known in the art. For example, in aqueous suspensions a strong base makes a suitable surfactant by provoking a repulsion between the silicon nitride particles, thereby improving its dispersion. Any inorganic or organic base which is soluble in water is acceptable, including ammonia, alkali metal hydroxides, alkali metal alkoxides, alkylamines, quaternary ammonium hydroxides, and metal silicates. Preferably, the surfactant is a metal silicate. More preferably, the surfactant is sodium silicate. When metal silicates are employed as surfactants, the surfactant is added to the aqueous suspension of magnesium oxide and calcium oxide prior to the addition of yttrium oxide and silicon nitride. Any amount of surfactant is acceptable providing the dispersion is improved. Typically, the amount of surfactant is in the range from about 0.01 to 1.0 weight percent of the powder mixture. Preferably, the amount is sufficient to raise the pH of the aqueous suspension to at least about 10. More preferably, the pH is raised to a value in the range from about 11.0 to about 11.5. Below the preferred lower pH limit and above the preferred upper pH limit, the solids tend to flocculate. The concentration of the surfactant should be strong enough to raise the pH to the desired level without substantially increasing the volume of the suspension or lowering the viscosity thereof.

After the colloidal suspension comprising silicon nitride, magnesium oxide, yttrium oxide, and calcium oxide in a carrier medium is prepared, the suspension is further agitated and mixed. The purpose of this further agitation is to break down any remaining agglomerates and assure a uniform, finely-divided suspension. The agitation is carried out by mechanical means, mentioned hereinbefore, preferably for a time in the range from about 30 minutes to about 16 hours depending on the type of agitator employed. Additionally, an ultrasonic vibrator can be used to aid in the deagglomeration. After the solid suspension is adequately dispersed, it is typically passed through a sieve to remove any remaining large agglomerates greater than about 100 μm in diameter. Finally, the pH of the finely-divided suspension is adjusted to about 10 in order to increase flocculation and maintain homogeneity during the drying process.

The finely-divided suspension is now ready for processing into greenware. For example, the suspension can be slip-cast by techniques well-known in the art for eventual sintering. Alternatively, the suspension can be dried into a powder and ground for use in hot-pressing processes. Drying is accomplished by standard drying means, such as by spray-drying or oven drying under a nitrogen purge. Preferably, drying is accomplished in an oven under a nitrogen purge. During the drying process free carrier medium is removed. The temperature of the drying depends on the boiling point of the carrier medium employed. Typically, the drying process is conducted at a temperature just below the boiling point of the carrier medium under atmospheric pressure. Preferably, the carrier medium is water and the temperature of drying is about 90° C. After drying, the resulting powder is sieved through a screen to obtain a powder having a maximum agglomerate diameter of about 100 μm. The screen size is usually less than about 60 mesh; more preferably, less than about 80 mesh. The powder which is obtained on sieving is the powder mixture which is used in the hot-pressing process of this invention.

The preferred method of processing the powder mixture is by hot-pressing, which comprises heating the powder under pressure to obtain the densified ceramic body. Any standard hot-pressing equipment is acceptable, such as a graphite die equipped with a heating means and a hydraulic press. The hot-pressing is conducted under an inert atmosphere, such as nitrogen, to prevent the oxidation and decomposition of silicon nitride at high temperatures. The direction of pressing is uniaxial and perpendicular to the plane of the plates.

Any processing temperature and pressure will suffice providing the novel silicon nitride ceramic of this invention, described hereinbelow, is obtained. Typically, however, the temperature must be carefully controlled, because the elongated β-silicon nitride whiskers are found to form in a narrow temperature range. Preferably, the temperature is maintained during pressurizing in the range from about 1750° C. to about 1870° C. More preferably, the temperature is maintained in the range from about 1800° C. to about 1850° C. Most preferably, the temperature is maintained in the range from about 1820° C. to about 1840° C. Below the preferred lower temperature limit the formation of elongated β-silicon nitride whiskers may be retarded. Above the preferred upper temperature limit the silicon nitride may decompose, and special pressure equipment may be required to conduct the densification. In a more preferred treatment, the sample is held at about 1700° C. for a time from about 5 minutes to about 15 minutes, cooled to about 1500° C. and then reheated at a temperature in the range from about 1750° C. to about 1870° C. for a time in the range from about 20 minutes to about 90 minutes. This preferred heating procedure produces a greater concentration of elongated β-silicon nitride crystals. It is noted that the accurate measurement of high temperatures, such as those quoted hereinabove, is technically difficult. Some variation in the preferred temperature range may be observed depending on the method employed in measuring the temperature. The preferred temperatures of this invention are measured by use of a tungsten-rhenium thermocouple, obtained from and calibrated by the Omega Company.

While the pressure during hot-pressing is important, it is not quite as critical a parameter as temperature. Typically, the pressure should be sufficient to cause densification of the green body. Preferably, the pressure is in the range from about 3000 psig to about 6000 psig; more preferably, from about 4000 psig to about 5500 psig; most preferably, about 4500 psig to about 5200 psig. Below the preferred lower pressure limit the powder will not be sufficiently densified. Above the preferred upper pressure limit the powder will densify in a shorter time and at a lower temperature. Although less rigorous processing conditions seem on the surface to be desirable, the formation of elongated $\beta$-silicon nitride crystals may be inhibited at lower temperatures and shorter pressing times.

The amount of time that the powder mixture is heated under pressure should be sufficient to bring the powder to essentially complete densification. Generally, ram movement is a good indicator of the extent of densification. As long as the ram continues to move, the densification is incomplete. When the ram has stopped moving for at least about 15 minutes, the densification is essentially complete at about 99 percent or greater of the theoretical value. Thus, the time required for hot-pressing is the time during ram movement plus about an additional 15 to 30 minutes. Preferably, the time is in the range from about 15 minutes to about 2 hours; more preferably, from about 30 minutes to about 90 minutes; most preferably, about 45 minutes to about 75 minutes.

The hot-pressing method of densification, described hereinbefore, allows for the formation of silicon nitride ceramic articles which can be used as cutting tools. A variety of shapes can be made by hot-pressing, one common shape being a flat plate. These plates may range in size from about 2 inches in length by about 1.5 inches in width by about 0.45 inch in thickness to about 16 inches in length by about 16 inches in width by about 1.0 inch in thickness. Smaller and larger plates can also be fabricated, as determined by the size of the hot-pressing plaques. Cutting tools can be fabricated by slicing and grinding these plates into a variety of cutting tool shapes.

The silicon nitride ceramic body which is produced by the hot-pressing process of this invention is a dense material having no significant porosity. Preferably, densification proceeds to greater than 95 percent of the theoretical value; more preferably, to greater than 97 percent of the theoretical value; most preferably, to greater than 99 percent of the theoretical value. Moreover, as measured by X-ray diffraction, the silicon nitride is present in the beta crystalline form, indicating essentially complete alpha to beta conversion during processing. Quite unexpectedly, the $\beta$-silicon nitride is present predominately as single crystal, "needle-like" whiskers, as determined by both scanning electron microscopy (SEM) and transmission electron microscopy (TEM). The size of the hexagonal $\beta$-silicon nitride grains is usually in the range from about 3 $\mu$m to about 20 $\mu$m in length with a mean diameter of from about 0.5 $\mu$m to about 1.5 $\mu$m; preferably from about 10 $\mu$m to about 20 $\mu$m in length with a mean diameter from about 0.5 $\mu$m to about 1.0 $\mu$m.

Since the whiskers are oriented randomly, it is difficult to determine exactly the percentage of silicon nitride which exists as whiskers, as opposed to equiaxed particles. The measurement is made by viewing one plane of the silicon nitride ceramic in a scanning electron microscope (SEM) and measuring the percentage by volume occupied by whiskers having an aspect ratio between 2 and 16. It is observed that the whiskers are homogeneously distributed and randomly oriented throughout the ceramic body, and that the volume occupied by the whiskers is approximately the same in all planes. Typically, the percentage of silicon nitride whiskers having an aspect ratio of between 2 and 16 is at least about 20 volume percent as measured in a plane. Preferably, the percentage of silicon nitride whiskers having an aspect ratio between 2 and 16 is at least about 35 volume percent as measured in a plane. Unexpectedly, the whiskers are found to have a high average aspect ratio. Typically, the average aspect ratio of the silicon nitride whiskers is at least about 2.5; preferably, at least about 5.5. It is noted that the SEM technique for measuring the volume percentage of whiskers is a lower bound. For example, a whisker which is perpendicular to the plane may have an apparent aspect ratio of less than 2; whereas the true aspect ratio may be very much greater than 2.

In addition to the $\beta$-silicon nitride phase, the ceramic body of this invention contains a glassy second phase, which constitutes no greater than about 35 weight percent of the total weight. The glassy second phase has a bulk chemical composition consisting essentially of from about 15 weight percent to about 51 weight percent magnesium oxide, from about 36 weight percent to about 63 weight percent yttrium oxide, from about 3 weight percent to about 30 weight percent silica, and from about 0.1 weight percent to about 15 weight percent calcium oxide, as determined by neutron activation analysis; and wherein the yttrium oxide to magnesium oxide weight ratio is in the range from about 0.7 to about 4.2.

Small quantities of silicon carbide and two unknown phases are present in a total amount not exceeding about 10 weight percent. One of the unknown phases possesses a fiber-like, layered and ordered structure. The typical size of the particles of this phase is about 500 Å in width by about 0.7 $\mu$m in length.

The mechanical properties of the self-reinforced silicon nitride ceramic body are readily measured by use of standard tests. In particular, fracture toughness ($K_{IC}$) is measured according to the Chevron notch and the Palmqvist methods described hereinafter. Fracture strength (modulus of rupture) is measured according to the Military Standard 1942b test. Hardness is measured according to the Vickers indentation test.

Fracture strength (modulus of rupture) measures the resistance of the material to fracture under a steady load. Fracture strength is defined as the maximum unit stress which the material will develop before fracture occurs. Test bars are prepared by cutting rectangular bars (45 mm×4 mm×3 mm) of the silicon nitride ceramic in a plane perpendicular to the pressing direction. The bars are ground on the surfaces parallel to the pressing plates using a 500 grid grinding wheel (Military Standard 1974). The fracture strength is measured at room temperature using a 4-point bend test with 20 mm span and crosshead speed of 0.5 mm/min. Typically, the fracture strength at room temperature is at least about 650 MPa. Preferably, the fracture strength at room temperature ranges from about 685 MPa to about 925 MPa; more preferably, from about 800 MPa to about 925 MPa. High temperature strength is measured using a 3-point bend test with 20 mm span and crosshead speed of 0.5 mm/min. Typically, at 1000° C. the fracture strength is at least about 550 MPa. Preferably, at 1000° C. the fracture strength ranges from about 580 MPa to about 650 MPa. Typically, at 1300° C. the fracture strength is at least about 300 MPa. Preferably, at 1300° C. the fracture strength ranges from about 400 MPa to about 500 MPa.

Toughness measures the resistance of the material to fracture under a dynamic load. More specifically, fracture toughness is defined as the maximum amount of energy which a unit volume of material will absorb without fracture. In the present invention two methods are employed to measure fracture toughness. The first of these is the Chevron notch test. Test bars are prepared as described hereinabove, and additionally scored with a Chevron notch. The test bars are then subjected to a 3-point bend test with 40 mm span and crosshead speed of 0.5 mm/min. Typically, the fracture toughness of the silicon nitride ceramic body of this invention, as measured at room temperature (taken as 23° C.) by the Chevron notch technique, is greater than about 6 MPa $(m)^{\frac{1}{2}}$. Preferably, the room temperature fracture toughness is greater than about 7 MPa $(m)^{\frac{1}{2}}$; more preferably, greater than about 8 MPa $(m)^{\frac{1}{2}}$. Most preferably, the room temperature fracture toughness ranges from about 9 MPa $(m)^{\frac{1}{2}}$ to about 14 MPa $(m)^{\frac{1}{2}}$. Preferably, at 1000° C. the fracture toughness is greater than about 6 MPa $(m)^{\frac{1}{2}}$. More preferably, at 1000° C. the fracture toughness ranges from about 7 MPa $(m)^{\frac{1}{2}}$ to about 12 MPa $(m)^{\frac{1}{2}}$.

In the evaluation of cutting tool materials it is useful to measure the Palmqvist toughness and the Vickers hardness. Both measurements can be made simultaneously on one test sample, and therefore these tests are very convenient.

The Vickers hardness test measures the resistance of the ceramic material to indentation. A sample, approximately 1 cm in length by 1 cm in width by 1 cm in height, is placed on a flat surface, and indented with a standard Vickers diamond indentor at a crosshead speed of 0.02 in/min. The Vickers hardness number is calculated from the applied load, in this case 14 kg, and the cross-sectional area of the indentation. Prior to making the test, the test sample is polished in a special manner. First, the sample is cleaned and rough spots are flattened by use of a 220-grid diamond wheel. Next, a 45-micron diamond wheel is used to start the polishing. Next, the sample is treated to a series of polishings at 30 psi and 200 rpm in the following consecutive manner; three five-minute intervals with 30-micron diamond paste, three five-minute intervals with 15-micron diamond paste, three five-minute intervals with 6-micron diamond paste, two five-minute intervals with 1-micron diamond paste, and one five-minute interval with 0.25-micron diamond paste. Between each interval the sample is thoroughly cleansed by washing with water and sonicating for two minutes. The Vickers hardness number of the silicon nitride ceramic of this invention is at least about 1325 kg/mm$^2$ at room temperature. Preferably, the Vickers hardness number ranges from about 1340 kg/mm$^2$ to about 1470 kg/mm$^2$ at room temperature; more preferably, from about 1370 kg/mm$^2$ to about 1470 kg/mm$^2$.

The Palmqvist toughness test is an extension of the Vickers test. (See S. Palmqvist in *Jerndontorets Annalen*, 141 (1957), 300, for a description of the Palmqvist toughness test.) The test sample is prepared and indented as in the Vickers test, but the 14 kg load is additionally held for 15 seconds. The sample cracks. The measurements of the indented diagonals and the crack lengths are made on a Nikon UM2 microscope at 1000x magnification. The Palmqvist toughness (W) is directly proportional to the applied load (P) and inversely proportional to the crack length (L). Preferably, the silicon nitride ceramic body of this invention exhibits a Palmqvist toughness at room temperature of at least about 37 kg/mm. Preferably, the silicon nitride ceramic body of this invention exhibits a Palmqvist toughness at room temperature in the range from about 37 kg/mm to about 52 kg/mm; more preferably, from about 45 kg/mm to about 52 kg/mm.

ILLUSTRATIVE EMBODIMENTS

The following examples serve to illustrate the novel self-reinforced silicon nitride composition of this invention, the method of preparing the novel silicon nitride ceramic, and the utility of the composition as a cutting tool. The examples are not intended to be limiting of the scope of this invention. All percentages are weight percent unless otherwise noted.

EXAMPLE 1

Materials: Silicon nitride (KemaNord P95-H) is employed containing 1.81 percent oxygen, 0.6 percent carbon, and the following major metallic impurities: 641 ppm iron, 315 ppm Al, and 25 ppm Ti. The silicon nitride is present in the alpha and beta crystalline forms in an $\alpha/\beta$ weight ratio of 95/5. The BET surface area of the silicon nitride powder is 10.15 m$^2$/g and the average particle size is about 1 μm in diameter. Magnesium oxide (J. T. Baker) is employed containing less than 5 ppm each of boron, zinc, and iron. Greater than 80 percent of the MgO particles range in size from 0.2 μm to 0.7 μm in diameter. Yttrium oxide (Molycorp) is employed containing less than 10 ppm each of sodium and iron. The Y$_2$O$_3$ particles range in size from 2 μm to 5 μm in diameter. Calcium oxide (Aldrich Chemical Co.) is employed containing less than 0.002 percent each of lead and iron. The average CaO particle size is about 3 μm in diameter.

The above-identified magnesium oxide (4.7 g) and calcium oxide powders (0.2 g) are suspended in 80 ml of water, and agitated at room temperature under air by means of a mechanical stirrer to form a two-oxide suspension. The pH of the suspension is adjusted to 11.35 by the addition of aqueous sodium silicate (7 drops). After adjustment of the pH, the suspension is ultrasonicated for 30 seconds to break down fine agglomerates. After sonication the pH is observed to drop. The pH is readjusted to 11.5 by adding 5 drops of 5 M sodium hydroxide. The suspension is mixed for about 30 minutes. Yttrium oxide powder (8.5 g), described hereinabove, is added to the suspension, and the suspension is sonicated for 30 seconds and mixed with a mechanical stirrer for 30 minutes. Silicon nitride powder (86.6 g), described hereinabove, is added to the suspension, and the suspension is mixed in an attrition mixer for about 30 minutes to ensure complete dispersion of all components. The resulting suspension is poured through a 100 mesh nylon sieve. The pH is adjusted to 9.8 by adding 10 ml of 50 percent nitric acid to increase the flocculation slightly. The finely divided suspension is dried in an oven at 90° C. for a period of 12 hours under a flow of dry nitrogen gas. After drying, the resulting powder mixture is passed through a 60 mesh sieve. The powder mixture is composed of 86.6 percent silicon nitride, 4.5 percent magnesium oxide, 8.5 percent yttrium oxide, and 0.2 percent calcium oxide.

The powder mixture (80 g), described hereinabove, is poured into a graphite die in the shape of plates measuring 2 inches in length by 1.5 inches in width by 0.5 inches in depth. A pressure of 1000 psig is applied to the die, while the temperature is raised from ambient to about 1200° C. in about 30 minutes. At about 1200° C. the pressure is gradually increased to 5000 psig and maintained thereat. The temperature is then increased to 1825° C. over a 40-minute period. The die is maintained at 1825° C. and a pressure of 5000 psig for 45 minutes. Afterwards the die is cooled over a 2 hour period to 100° C. At 1500° C. the pressure is slowly released. When the die reaches room temperature, it is opened, and a silicon nitride ceramic body in the shape of a plate having the above-identified dimensions is retrieved.

The density of the silicon nitride ceramic body, prepared hereinabove, is measured by the water immersion method, as described in "Modern Ceramic Engineering" by D. W. Richerson, Marcel Dekker, 1982, and by stereology analysis from photomiorographs. The density is essentially 100 percent of theoretical, and therefore the material is essentially nonporous. Silicon nitride is present essentially in the $\beta$ crystalline phase, as determined by X-ray diffraction. The bulk chemical composition of the ceramic is determined by neutron activation analysis, and is found to contain 77.2 percent silicon nitride, 20.4 percent glassy second phase, and 2.4 percent silicon carbide. The glassy second phase is found to consist of 32.4 percent magnesium oxide, 42.2 percent yttrium oxide, 2.5 percent calcium oxide, and 23.0 percent silicon oxide. Two unidentified phases are found. The first is present in a quantity of 3.9 percent, and possesses a composition of 9 percent magnesium, 59 percent silicon and 32 percent nitrogen. The second is present in a quantity of 1 percent, and possesses a fiber-like, layered and ordered structure typically 500 Å in width and 0.7 μm in length. The microstructure of the silicon nitride ceramic, prepared hereinabove, is determined by scanning electron microscopy (SEM), as viewed in a plane. About 35 volume percent of the silicon nitride appears in the form of elongated whiskers having an aspect ratio ranging from 2 to 16. The average aspect ratio is 5.6.

The fracture strength of the above-identified silicon nitride ceramic body, measured by the 4-point bend test described hereinbefore, is 130 ksi (890 MPa) at room temperature and 90 ksi (616 MPa) at 1000° C. The fracture toughness measured by the Chevron notch technique is 13.9 MPa (m)$^{\frac{1}{2}}$ at room temperature and 11.5 MPa (m)$^{\frac{1}{2}}$ at 1000° C. The Vickers hardness measured at room temperature and under a 14 kg load ranges from 1350 kg/mm$^2$ to 1400 kg/mm$^2$ and averages 1375 kg/mm$^2$. The Palmqvist toughness measured at room temperature ranges from 49.3 kg/mm to 51.1 kg/mm. It is seen that the fracture toughness of this silicon nitride ceramic body is very high.

EXAMPLES 2 (a–n)

A series of hot-pressed silicon nitride ceramic compositions is prepared according to the procedure of Example 1, except that the composition of the powder mixture is varied as described in Table I. The Vickers hardness and the Palmqvist toughness measured at room temperature are presented in Table I for each composition.

TABLE I*

| Ex. 2 | % Si$_3$N$_4$ | % MgO | % Y$_2$O$_3$ | % CaO | Y$_2$O$_3$/MgO | Palmqvist Toughness (kg/mm) | Vickers Hardness (kg/mm$^2$) |
|---|---|---|---|---|---|---|---|
| a | 86.10 | 2.65 | 11.20 | 0.05 | 4.23 | 36.9 | 1461 |
| b | 86.45 | 3.50 | 10.00 | 0.05 | 2.85 | 40.2 | 1403 |
| c | 86.65 | 4.30 | 9.00 | 0.05 | 2.10 | 39.6 | 1353 |
| d | 86.75 | 4.70 | 8.50 | 0.05 | 1.81 | 42.2 | 1442 |
| e | 87.05 | 5.40 | 7.50 | 0.05 | 1.39 | 40.6 | 1392 |
| f | 87.25 | 6.10 | 6.60 | 0.05 | 1.10 | 42.4 | 1379 |
| g | 87.65 | 7.20 | 5.10 | 0.05 | 0.70 | 38.9 | 1324 |
| h | 86.40 | 3.50 | 10.00 | 0.10 | 2.85 | 44.5 | 1392 |
| i | 86.70 | 4.70 | 8.50 | 0.10 | 1.81 | 47.5 | 1401 |
| j | 87.60 | 7.20 | 5.10 | 0.10 | 0.70 | 40.2 | 1385 |
| k | 86.60 | 4.70 | 8.50 | 0.20 | 1.81 | 51.0 | 1391 |
| l | 86.60 | 4.70 | 8.20 | 0.50 | 1.82 | 47.6 | 1380 |
| m | 86.30 | 4.50 | 8.20 | 1.00 | 1.82 | 44.2 | 1375 |
| n | 85.30 | 4.50 | 8.20 | 2.00 | 1.82 | 40.1 | 1370 |

*Percentages of components are based on weight percent in the powder mixture. Toughness and hardnesss values are measured at room temperature.

The data show that the Palmqvist toughness and the Vickers hardness vary as a function of the calcium oxide concentration and the Y$_2$O$_3$/MgO weight ratio in the powder mixture. For example, it is seen in Examples 2(d,i,k,l,m,n) that as the calcium oxide concentration increases at constant Y$_2$O$_3$/MgO ratio, the fracture toughness passes through a maximum value of 51 kg/mm at a calcium oxide concentration of 0.20 weight percent. As the calcium oxide concentration increases at constant Y$_2$O$_3$/MgO ratio, the hardness decreases.

COMPARATIVE EXPERIMENTS 1(a–d)

Four hot-pressed silicon nitride ceramic bodies are prepared as in Example 1, except that calcium oxide is omitted from the preparation. The powder compositions are listed in Table II. The Vickers hardness and the Palmqvist toughness are measured as described in Example 2, and the values are tabulated in Table II.

TABLE II*

| Comp. Ex. 1 | % Si₃N₄ | % MgO | % Y₂O₃ | Y₂O₃/ MgO | Palmqvist Toughness (kg/mm) | Hardness (kg/mm²) |
|---|---|---|---|---|---|---|
| a | 86.40 | 3.60 | 10.00 | 2.78 | 36.6 | 1407 |
| b | 86.80 | 4.70 | 8.50 | 1.81 | 36.1 | 1377 |
| c | 87.75 | 7.20 | 5.05 | 0.70 | 36.1 | 1438 |
| d | 93.20 | 2.42 | 4.38 | 1.81 | 35.8 | 1395 |

*Percentages of components are based on weight percent in the powder mixture. Toughness and hardness values are measured at room temperature.

When Comparative Experiments 1(b,d) are compared with Examples 2(d,i,k,l,m,n) it is seen that the self-reinforced silicon nitride ceramic body of this invention possesses a significantly higher Palmqvist toughness than the samples which do not contain calcium oxide. The same conclusion holds on comparing Comparative Experiment 1(a) with Examples 2(b and h). Even at a low Y₂O₃/MgO ratio and a low calcium oxide concentration, the improvement in the ceramic body of this invention is noticeable, as seen in the comparison between Comparative Experiment 1(c) and Examples 2(g and j).

EXAMPLES 3(a–c)

Three hot-pressed silicon nitride compositions are prepared according to the procedure of Example 1, except that the powder compositions are varied as described in Table III. The Y₂O₃/MgO ratio in these powder compositions is 1.82. The Palmqvist toughness and the Vickers hardness are measured at room temperature according to the procedure in Example 2. The values obtained are presented in Table III.

TABLE III*

| Ex. 3 | % Si₃N₄ | % MgO | % Y₂O₃ | % CaO | % Glass Content | Palmqvist Toughness (kg/mm) | Hardness kg/mm² |
|---|---|---|---|---|---|---|---|
| a | 93.15 | 2.40 | 4.35 | 0.10 | 6.85 | 39.9 | 1371 |
| b | 86.70 | 4.70 | 8.50 | 0.10 | 13.30 | 46.2 | 1396 |
| c | 80.40 | 6.90 | 12.60 | 0.10 | 19.60 | 48.3 | 1389 |

*Percentages of components are based on weight percent in the powder. Toughness and hardness values are measured at room temperature.

The data show that as the glass content increases, the Palmqvist toughness also increases; whereas the Vickers hardness varies in a non-linear fashion.

EXAMPLE 4

The hot-pressed silicon nitride ceramic body of Example 1 is diamond ground into a cutting tool insert. The cutting tool insert is made according to the ANSI standards in the SNG 433 style. The cutting edge is chamfered at a 20° angle by 0.008-inch width. The insert is tested in a face milling application using a 40 HP Cincinnati #5 single spindle, knee and saddle, vertical milling machine with a 5 HP variable speed table. The work material is a nodular "ductile" cast iron measuring 2 inches in diameter and having a measured hardness of 207 BHN. A milling cutter having a 6-inch diameter is used with a −5° axial rake and a −5° radial rake. A 15° lead angle is employed. The machine is run at a cutting speed of 1360 surface feet per minute, a 0.060-inch depth of cut, and a feed rate of 0.005 inch per revolution (or tooth). The center line of the cutter and the center line of the workpiece are coincident. No cutting fluid is used. Successive passes are taken on the cast iron, and the cutting edge is examined for flank wear and chippage after every 8 passes. Testing is terminated when the flank wear or chippage exceeds 0.015 inch in depth as measured with a 30-power microscope. It is found that an average of 26.0 passes are achieved prior to failure. The flank wear is uniform.

COMPARATIVE EXPERIMENT 2 (a–b)

A commercial silicon nitride ceramic body is obtained from each of the following sources: (a) Boride Products (Product No. US-20) and (b) GTE Valeron Corporation (Product No. Q6). Each sample is diamond ground into a cutting tool in the manner described in Example 4. The cutting tools are used to cut nodular "ductile" cast iron in the manner described in Example 4. It is found that an average of 13.5 passes of the Boride Products sample are achieved prior to failure, and an average of 10.5 passes of the GTE sample are achieved prior to failure. In both cases the flank wear is uniform. When Comparative Experiments 2(a and b) are compared with Example 4, it is seen that the silicon nitride ceramic body of this invention significantly outperforms the commercial products.

What is claimed is:

1. A process for preparing a silicon nitride ceramic body having a fracture toughness greater than about 6 MPa (m)$^{178}$ and containing predominantly β-silicon nitride whiskers having an average aspect ratio of at least about 2.5, the process comprising:
  preparing a powder mixture comprising
   (a) silicon nitride in an amount sufficient to provide a ceramic body;
   (b) magnesium oxide in an amount sufficient to promote densification of the powder;
   (c) yttrium oxide in an amount sufficient to promote the essentially complete conversion of the starting silicon nitride to β-silicon nitride; and
   (d) calcium oxide in an amount sufficient to promote the formation of β-silicon nitride whiskers, and hot-pressing the powder under conditions such that densification and in situ formation of β-silicon nitride whiskers having an average aspect ratio of at least about 2.5 occur and such that the silicon nitride ceramic body having a fracture toughness greater than about 6 MPa (m)$^{\frac{1}{2}}$ is formed.

2. The process of claim 1 wherein the percentage of β-silicon nitride whiskers having an aspect ratio of between 2 and 16 is at least about 20 volume percent, as measured by viewing one plane of the silicon nitride ceramic body by scanning electron microscopy.

3. The process of claim 2 wherein the percentage of β-silicon nitride whiskers having an aspect ratio of between 2 and 16 is at least about 35 volume percent, as measured by viewing one plane of the silicon nitride ceramic body by scanning electron microscopy.

4. The process of claim 1 wherein the β-silicon nitride whiskers having an average aspect ratio of at least about 5.5.

5. The process of claim 1 wherein the silicon nitride in the powder mixture contains no greater than about 10 weight percent β-silicon nitride.

6. The process of claim 1 wherein the magnesium oxide is in the range from about 1.0 weight percent to about 20.6 weight percent based on the total weight of the powder mixture.

7. The process of claim 1 wherein the yttrium oxide is in the range from about 0.7 weight percent to about 28.3 weight percent based on the total weight of the powder mixture.

8. The process of claim 1 wherein the calcium oxide is in the range from about 0.01 weight percent to about 5.3 weight percent based on the total weight of the powder mixture.

9. The process of claim 1 wherein the weight ratio of yttrium oxide to magnesium oxide is in the range from about 0.7 to about 4.2.

10. The process of claim 1 wherein conditions for hot pressing the powder include a temperature in a range from about 1750° C. to about 1870° C.

11. The process of claim 11 wherein the temperature is in the range from about 1800° C. to about 1850° C.

12. The process of claim 1 wherein conditions for hot pressing the powder include a pressure in a range from about 3000 psig to about 6000 psig.

13. The process of claim 1 wherein the density of the silicon nitride ceramic is greater than about 95 percent of the theoretical value.

14. The process of claim 13 wherein the density of the silicon nitride ceramic is greater than about 99 percent of the theoretical value.

15. A process for preparing a silicon nitride ceramic body having a fracture toughness greater than about 6 MPa (m)$^{\frac{1}{2}}$ and containing predominantly β-silicon nitride whiskers having an average aspect ratio of at least about 2.5, the process comprising:
preparing a powder mixture comprising
  (a) silicon nitride in an amount sufficient to provide a ceramic body;
  (b) magnesium oxide in an amount of from about 1.0 to about 20.6 weight percent based upon total weight of the powder mixture, said amount being sufficient to promote densification of the powder;
  (c) yttrium oxide in an amount of from about 0.7 to about 28.3 weight percent based upon total weight of the powder mixture, said amount being sufficient to promote the essentially complete conversion of the silicon nitride to β-silicon nitride; and
  (d) calcium oxide in an amount of from about 0.01 to about 5.3 weight percent based upon total weight of the powder mixture, said amount being sufficient to promote the formation of β-silicon nitride whiskers,
and hot-pressing the powder under conditions such that densification and in situ formation of β-silicon nitride whiskers having an average aspect ratio of at least about 2.5 occur and such that the silicon nitride ceramic body having a fracture toughness greater than about 6 MPa (m)$^{\frac{1}{2}}$ is formed.

* * * * *

UNITED STATES PATENT AND TRADEMARK OFFICE
CERTIFICATE OF CORRECTION

PATENT NO. : 4,883,776

DATED : November 28, 1989

INVENTOR(S) : Aleksander J. Pyzik, William J. Dubensky, Douglas B. Schwarz, and Donald R. Beaman It is certified that error appears in the above-identified patent and that said Letters Patent is hereby corrected as shown below:

Column 4, line 63 please delete "wight" and insert -- weight --.

Column 5, line 5 please delete "200° C." and insert -- 1200° C. --.

Column 13, line 48 please delete "photomiorographs" and insert -- photomicrographs --.

Column 13, lines 64-65 please delete "like, layered" and insert -- like, layered --.

Column 16, line 24 please delete "$(m)^{178}$" and insert -- $(m)^{\frac{1}{2}}$ --.

Column 16, line 67 please delete "having" and insert -- have --.

Column 17, line 26 please delete "11" and insert -- 10 --.

Signed and Sealed this

Twenty-eighth Day of May, 1991

*Attest:*

HARRY F. MANBECK, JR.

*Attesting Officer*      *Commissioner of Patents and Trademarks*